March 14, 1961 J. J. MOORE ET AL 2,975,373
LOW FREQUENCY SIGNAL AMPLIFIER
Filed Nov. 28, 1958

INVENTORS.
JAMES J. MOORE
NELSON N. ESTES.
BY John F. Hohmann

United States Patent Office 2,975,373

Patented Mar. 14, 1961

2,975,373

LOW FREQUENCY SIGNAL AMPLIFIER

James J. Moore and Nelson N. Estes, Austin, Tex., assignors to Union Carbide Corporation, a corporation of New York Filed Nov. 28, 1958, Ser. No. 777,010

2 Claims. (Cl. 330—41)

This invention relates to a low frequency signal amplifier and refers particularly to such a device having an electrical readout integrator.

A family of electrochemical devices in which a number of different effects are achieved by the movement of ions in solution has recently attracted favorable attention. These devices have come to be known as "solions." They are discussed in some detail in the literature: Journal of the Electrochemical Society, vol. 104, No. 12 (December 1957); Yale Scientific Magazine, vol. XXXII, No. 5 (February 1958) and Electronics Products Engineering Bulletin No. 1, published November 1957, by National Carbon Company, 30 East 42nd Street, New York 17, N.Y.

In application Serial No. 717,621, filed February 26, 1958, by Earl S. Snavely, Jr., now Patent No. 2,890,414, reference is made to a particular type of solion described therein as an "electrochemical coulometer" and commonly referred to as an "integrator." This device has the ability to indicate the integral of a current applied to it over a period of time. One type of integrator is provided with electrodes so that its signal can be read electrically; it is termed an "electrical read-out integrator." The present invention employs such a device as its essential component; its construction and function will be explained below.

The invention has for its object an electrochemical amplifier which will amplify a low frequency signal. It will be discussed with reference to the accompanying drawing, in which.

Figure 1:
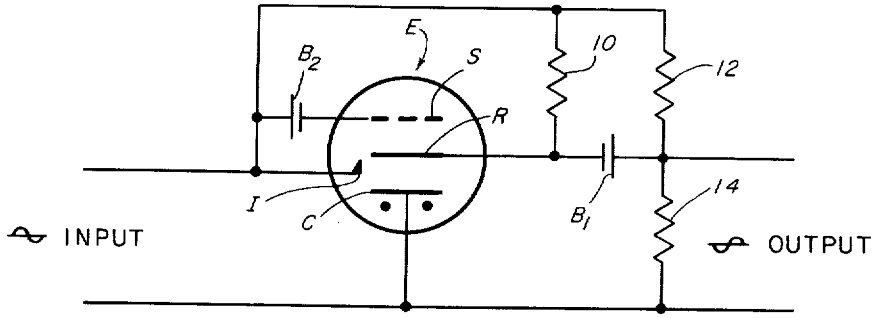
Fig. 1 is a circuit diagram illustrating the amplifier of the invention.

The invention comprises an amplifier for amplifying a low frequency signal which amplifier has as its basic component an electrical readout integrator. A biasing resistor is connected between the readout electrode and the input electrode of the integrator, and a feedback network consisting of a second resistor and the load resistance is connected in series between the input electrode and the common electrode of the integrator. The invention also includes a modified amplifier in which a capacitor is connected in series with the signal source. In this form, the amplifier produces an amplified derivative of the original signal.

An electrical readout integrator as the term is used herein and in the appended claims is a solion consisting of a cell containing as electrolyte a solution of a reversible redox system, the solution being divided into three zones of different concentration of a measured species of such system, all zones being electrically connected through the electrolyte. One of the three zones is of variable concentration. It is called the "integral" zone. It is provided with two electrodes, one termed the "Common" electrode, or integrator anode, the other the "Readout" electrode, or integrator cathode. Another zone of concentration which is high in concentration of the measured species is referred to as a "reservoir" zone. It contains an electrode termed the "Input" or reservoir electrode. Separating the integral zone and the reservoir zone is a zone dilute in the measured species of the redox system. It is provided with an electrode called a "Shield" or scavenger electrode.

In operating an electrical readout integrator, a biasing voltage is applied across the common and readout electrodes, the common electrode being made the anode of the circuit, so as to furnish the readout current which is proportional to the concentration in the integral zone. A similar biasing voltage is applied across the shield and input electrodes, the latter being made the anode so as to maintain a high concentration of measured species in the reservoir zone and to clear the dilute zone of any ions of the measured species which may have escaped into it from the integral zone. With these electrodes biased as described, when a source of current is connected across the input electrode and the common electrode so that the latter is the anode, the concentration of the measured species of the redox system is increased in the integral zone. The increase can be read electrically on a suitable meter in the biasing circuit of the integral zone. When the current source is disconnected, the increased concentration of measured species is maintained in the integral zone by reason of the configuration and location of electrodes in that zone, and when the source is again connected, again an increase in concentration is noted. Thus, the device integrates the current applied over a period of time.

Referring now to the drawing, an electrical readout integrator E is diagrammatically represented. The biasing voltage across the readout electrode R and the common electrode C is provided by a battery $B_1$ connected so as to make the common electrode C the anode. The biasing voltage across the shield electrode S and the input electrode I is provided by a battery $B_2$ connected so as to make the input electrode I the anode of the circuit. Both batteries have the same voltage, suitably 0.9 volt.

A biasing resistor 10 is connected between the readout electrode R and the input electrode I and a feedback network consisting of a second resistor 12 and a load resistance 14 is connected in series between the input electrode I and the common electrode C of the integrator E.

The voltage through the resistor 12 and the voltage through the load resistance 14 oppose each other and are so balanced that the resultant voltage is applied between the input electrode I and the common electrode C. This resultant voltage, which is very low, is sufficient to maintain a desired concentration of the measured species of the redox system between the electrodes R and C in the integral compartment of the integrator E.

When a signal is fed to the integrator E through the input electrode I and the common electrode C (both being input electrodes in the circuit illustrated), a feedback signal from the load resistance 14 which is 180° out of phase with the input signal is fed back to the input electrode I and the common electrode C. This feedback signal, which is proportional to the magnitude of the input signal, continuously corrects the tendency of the integrator to integrate the total input without reference to an operating level and thereby causes the amplifier output to reproduce the original input wave form except that it is 180° out of phase with the input signal.

Figure 2:
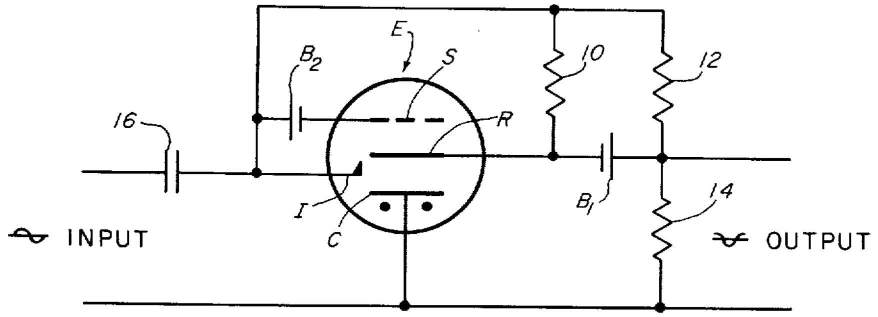
Fig. 2 is a similar diagram of a modified amplifier circuit.

Referring now to Fig. 2, the amplifier of the invention can be modified to produce a derivative of an input signal by placing a capacitor 16 in series with the signal source and the input electrode I and the common electrode C. When a condenser and a resistor, properly balanced with respect to each other and to the frequency of the signal, are connected in series with the signal a signal is produced which is a derivative of the original signal. In this case the resistance is the resistance in the solutions in the integrator E. The derivative signal thereby produced is amplified by the amplifier and a signal is produced which is 90° out of phase with the original input signal.

In one amplifier constructed in accordance with the circuit of Fig. 1 the integrator had an electrolyte containing the iodine-iodide system dissolved in a methyl alcohol-water mixture containing 25% alcohol by volume. The solution was 0.025 N in iodine and 0.5 N in potassium iodide. The batteries $B_1$ and $B_2$ had a voltage of 0.9 volt. The resistor 10 had a resistance of 15,000 ohms; the resistor 12 had a resistance of 25,000 ohms, and the load resistance 14 was 2200 ohms. Signals varying from 1 cycle per hour to 0.5 cycle per second were successfully amplified. A voltage amplification of 18 times and a power amplification of 70 times have been obtained with the circuit of Fig. 1. In a device made in accordance with the modified circuit of Fig. 2 the capacitor 16 had a capacity of 800 microfarads. This amplifier, too, performed successfully.

It will be seen that the invention thus provides effective amplification of low frequency signals. A theoretical explanation for the operation of the circuit of the invention may be set forth as follows.

Let the output current be designated $I_o$; the input current from the source may be designated $I_n$ which equals $I_p \sin \omega t$ where $I_p$ is the peak value of the current and $\sin \omega t$ represents an alternating signal of frequency, $$f=\frac{\omega}{2\pi}$$

The output current is proportional to the integral of the input current and is expressed by the following equation:

$$I_o=k\int I_p \sin \omega t dt \quad (1)$$

Carrying out the mathematical operation indicated by Equation 1 gives $$I_o=\frac{kI_p}{\omega}(-\cos \omega t) \quad (2)$$

The $(-\cos \omega t)$ simply indicates that the output signal is a sine function which has been shifted backwards in time by an angle equal to $$\frac{\pi}{2}$$

If the gain of the amplifier is defined to be:

$$G=\frac{I_o}{I_{in}} \quad (3)$$

then the gain is given by $$G=\frac{I_o}{I_{in}}=\frac{\frac{kI_p}{\omega}(-\cos \omega t)}{I_p \sin \omega t} \quad (4)$$

It will be noted that for unity gain $k=\omega$ or, in other words, the cut-off frequency at which the gain is unity is equal to the constant of proportionality factor between the output current and the integral of the input current. The general expression for the gain (Equation 4) shows that the gain is inversely proportional to $\omega$ which is characteristic of any device in which the output current is proportional to the integral of the input current. The phase shift between input and output is $$\frac{\pi}{2}$$

radians at the frequency where the gain is unity.

In the circuit of the invention the output current divides, part flowing through resistors 10, 12 and part in the output or load resistance 14. If resistors 10 and 12 are large compared to the load resistance, then the current gain is essentially that given by Equation 4 above. If the phase shift is neglected, the magnitude of the gain is given by $$G=\frac{k}{\omega} \quad (5)$$

However, in a practical situation, resistors 10 and 12 are not negligible and must be considered. Since the current is inversely proportional to the value of the resistor, then it may be shown that the gain of the device is given by $$\frac{I_L}{I_o}=\frac{R_{10}R_{12}}{R_{10}R_{14}+R_{12}R_{14}+R_{10}R_{12}} \quad (6)$$

where the subscripts refer to the same item in Figs. 1 and 2. The gain as given in Equation 5 must then be multiplied by the ratio shown in Equation 6. Thus the frequency at which the gain is equal to any specified value can be determined and is less than the value which is given for the device itself, that is, when Items 10 and 12 are large without limit.

A full description of an electrical readout integrator suitable for use in the amplifier of the invention is found in the application of Nelson N. Estes, Ser. No. 777,009 filed concurrently herewith.

We claim:

1. An amplifier for amplifying a low frequency signal, which comprises an electrical readout integrator, said integrator comprising a cell containing as an electrolyte a solution of a reversible redox system, said solution being divided into zones of different concentration of a measured species of said system, a readout electrode and a common electrode in one of said zones having a variabe concentration of said measured species, an input electrode in another of said zones high in concentration of said measured species and a shield electrode in a zone dilute in said measured species, said readout electrode being biased negative with respect to said common electrode and said shield electrode being biased negative with respect to said input electrode, a biasing resistor connected between the readout electrode and the input electrode of said integrator, and a feedback network consisting of a second resistor and a load resistance connected in series between the input electrode of said integrator and the common electrode thereof.

2. An amplifier as defined by claim 1 wherein a capacitor is connected in series with a signal to be amplified and the input electrode of said integrator.

References Cited in the file of this patent

UNITED STATES PATENTS

| | | |
|---|---|---|
| 1,180,090 | Thorpe | Apr. 18, 1916 |
| 2,685,025 | Root | July 27, 1954 |
| 2,824,242 | Hardy et al. | Feb. 18, 1958 |
| 2,858,527 | Bowditch et al. | Oct. 28, 1958 |